United States Patent [19]

Bokel

[11] 4,326,132
[45] Apr. 20, 1982

[54] ULTIMATE ENERGY WHEEL DRUM

[76] Inventor: Aloys H. Bokel, 26091 Alice La., Hemet, Calif. 92343

[21] Appl. No.: 190,244

[22] Filed: Sep. 24, 1980

[51] Int. Cl.³ .............................................. F03B 9/00
[52] U.S. Cl. ................................... 290/1 R; 60/496; 415/5
[58] Field of Search .................... 415/5, 7; 416/7, 84; 417/62; 60/495, 496; 290/1 R

[56] References Cited

U.S. PATENT DOCUMENTS

| | | | |
|---|---|---|---|
| 3,984,698 | 10/1976 | Brewer | 290/54 |
| 4,054,031 | 10/1977 | Johnson | 415/7 |
| 4,242,868 | 1/1981 | Smith | 415/5 |

FOREIGN PATENT DOCUMENTS 2276479 1/1976 France ............................... 60/495

*Primary Examiner*—J. V. Truhe
*Assistant Examiner*—Shelley Wade

[57] ABSTRACT

A power generating apparatus, in which air is discharged into a lower portion of a rotatable, underwater wheel or the like, so as to provide buoyancy, in order to rotate the wheel and drive an electric generator; the apparatus including, in one design thereof, an endless bucket-line around a periphery of an upper and lower rotatable wheel, the buckets at a lower end of the line being turned into inverted position where an air nozzle, directed under the buckets, fills them with air, so as to cause the buckets to lift.

3 Claims, 11 Drawing Figures

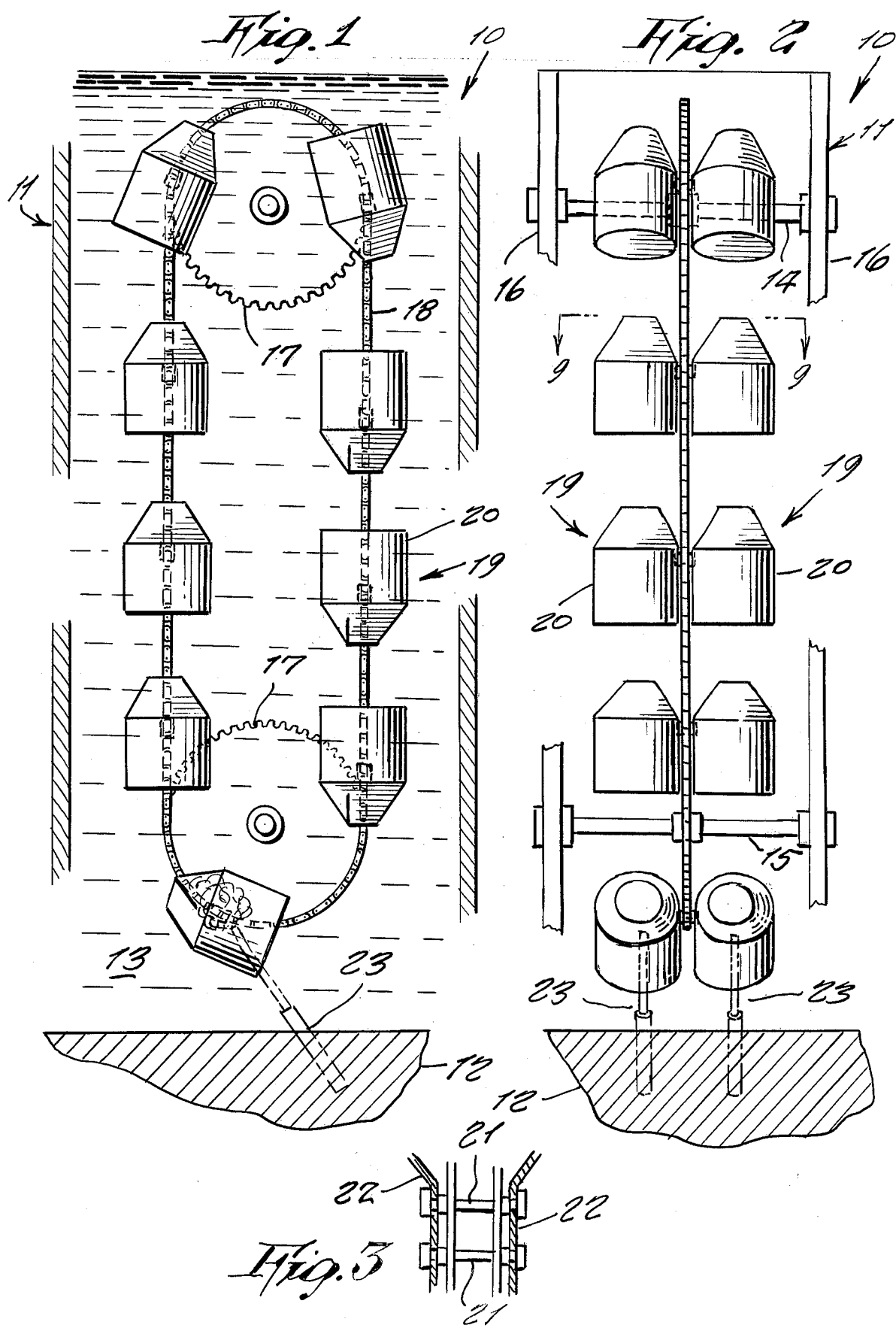

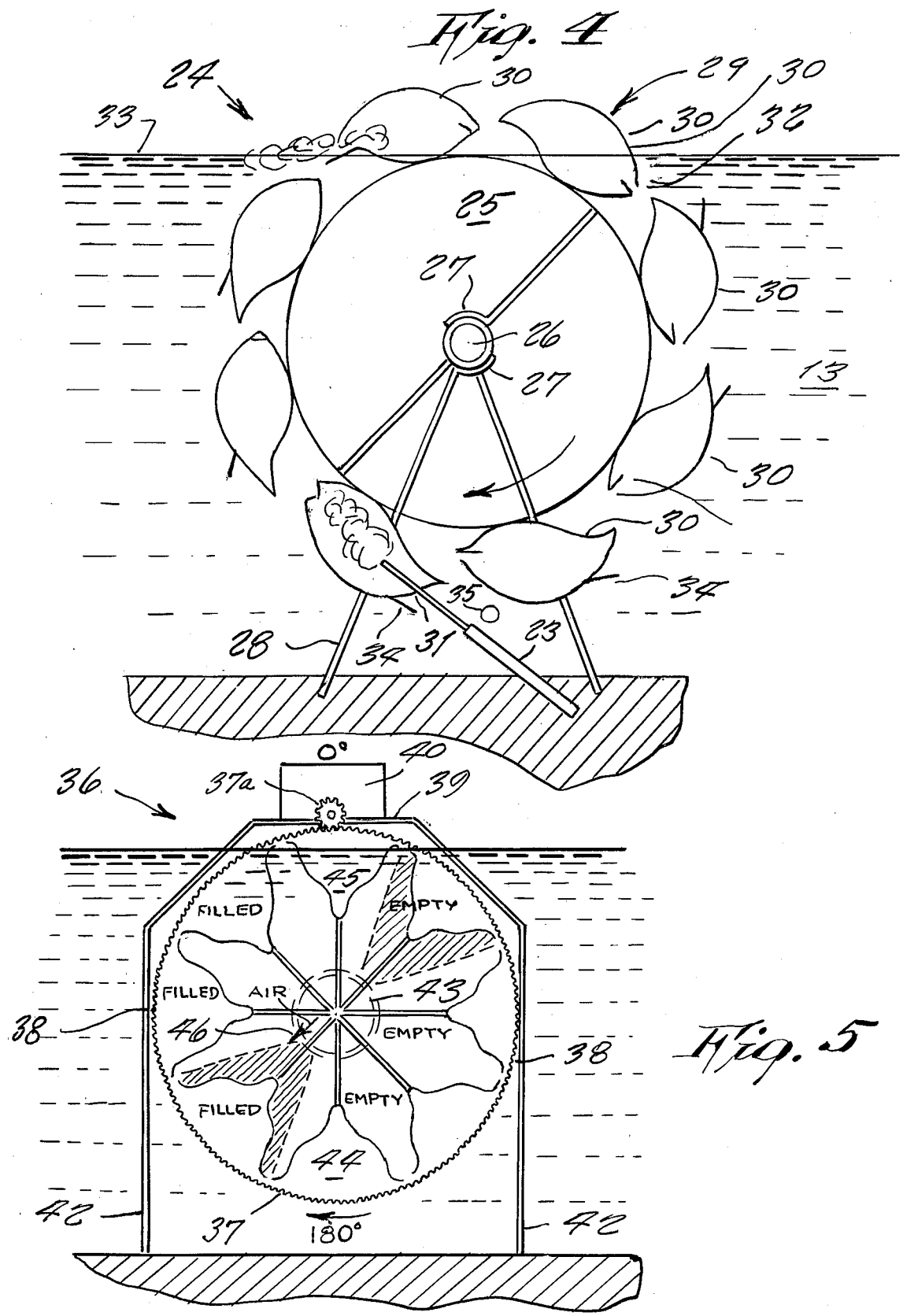

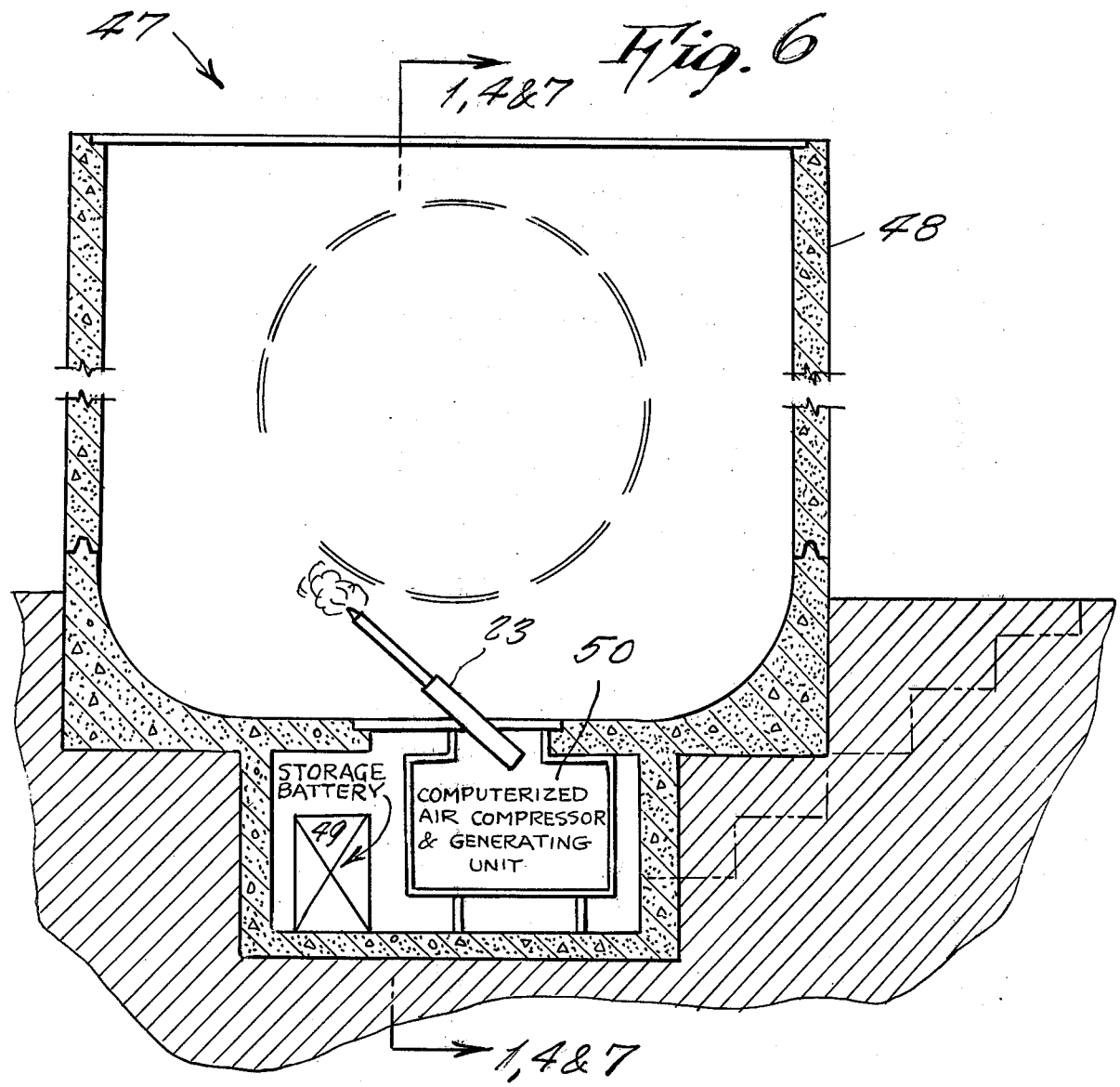
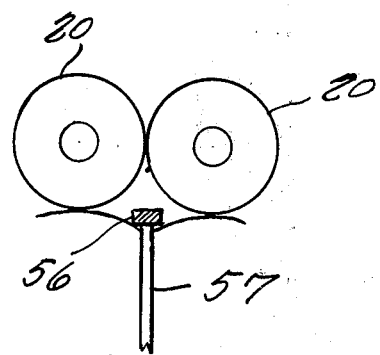
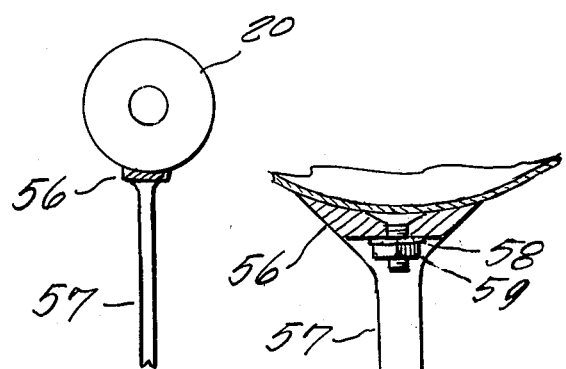

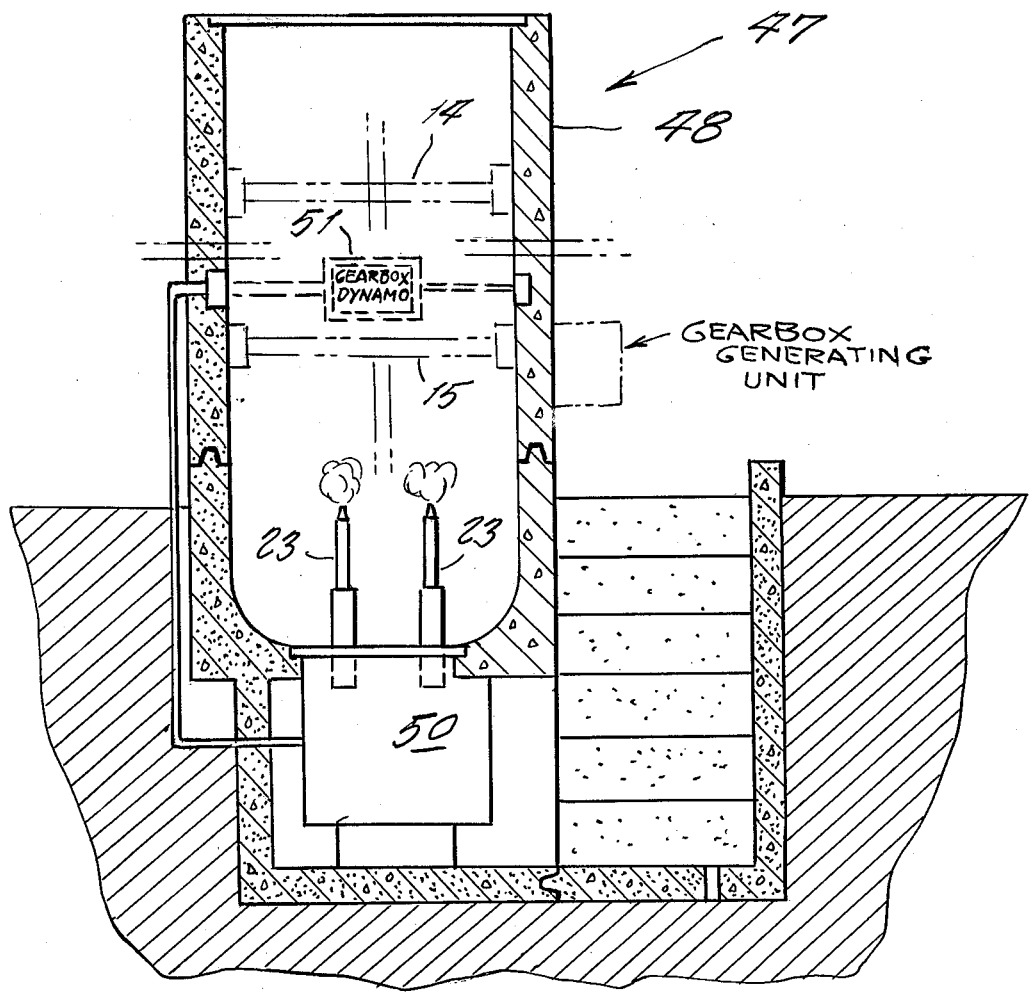
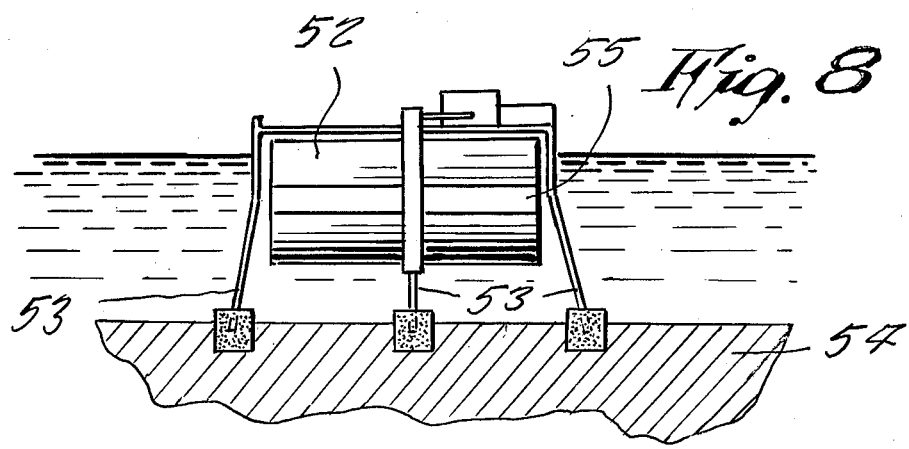

ULTIMATE ENERGY WHEEL DRUM

This invention relates generally to power generating apparatus.

A principal object of the present invention is to provide an apparatus wherein air is computerizedly injected under a mass of water, exerting a specific anti-gravitational or buoyancy force, so as to drive a power generator.

Another object is to provide a power generating apparatus, which differs from solar energized apparatus by incorporating operating principles that have already today been well developed for an ultimate practical use instead of relying on developments to be yet made in the future in order to be practical some day.

Yet another object of this invention is to provide an ultimate energy wheel drum apparatus, which also can be built on any desired scale, so as either to provide energy for a limited need, or else provide energy on a large scale to meet the requirements of a power company for a large metropolis.

Other objects are to provide an ultimate energy wheel drum, which is simple in design, inexpensive to manufacture, rugged in construction, easy to use, and efficient in operation.

These, and other objects will be readily evident, upon a study of the following specification, and the accompanying drawings, wherein:

FIG. 1 is a front elevation view of the ultimate energy wheel (endless bucket lines);

FIG. 2 is a side elevation view thereof;

FIG. 3 is an enlarged detail of a chain link thereof;

FIG. 4 is a side elevation view of another design thereof;

FIG. 5 is a similar view of still another design, (drum design);

FIG. 6 is a front cross-sectional view of a precast, reinforced concrete water tank for the ultimate energy wheel and endless bucket lines;

FIG. 7 is a cross-sectional view, on line 1, 4, 7—1, 4, 7 of FIG. 6;

FIG. 8 is a side view of the drum and dynamo support;

FIG. 9 is a cross-sectional view in direction 9—9 of FIG. 2, and illustrating a modified design, wherein a double row of receptacles are carried on a peripheral rim of a wheel; this could be increased to 3, 4, 5, 6, etc. rows;

FIG. 10 is a modified design thereof, wherein there is a single row of receptacles; and FIG. 11 is an enlarged cross-sectional view of the wheel rim shown in FIG. 10.

Referring now to the drawings in greater detail, and more particularly to FIGS. 1 to 3 thereof, at this time, the reference numeral 10 represents a power generating apparatus, according to the present invention, wherein there is a tall tank 11, standing upon a base 12, for containing a deep body of water 13. An upper cross shaft 14, and a lower cross shaft 15, are supported between opposite side walls 16 of the tank, so as to extend through the water body. Upon each cross shaft, there is mounted a gear 17, and an endless chain 18 extends around both gears, engaging the teeth thereof. Two rows 19 of buckets 20 are mounted along the chain in a rigid manner, so that an open end of each faces a closed end of an adjacent bucket. As shown in FIG. 2, the rows 19 are on opposite sides of the chain, with the buckets of the other side. Each bucket is tapered at its closed end, and each bucket is rigidly fixed in position on the chain, by means of a pair of the chain cross pins 21 extending through a flange 22 thereof.

A pair of computerized air injectors 23 protrude upwardly, at an inclined angle from the base, each injector aligning with one of the rows 19, so that air from the nozzle of the injector bubbles upwardly in a precise area, therefrom, inside the lowermost bucket, this resulting in closing the flap valve. The air bubbles replace the water inside the bucket, thus giving buoyancy thereto. Thus, the vertical rows of buckets along one side of the apparatus, all being inverted, hold a total quantity of air having sufficient buoyancy so as to cause these buckets to rise upwardly in the water, and thus carry the chain therewith, and accordingly rotate the gears. At the upper end of the bucket travel, they invert upright as they travel around the upper gear, so that, on their downward travel, the flap valve will open and the buckets fill with water.

Air to the injectors is supplied from a compressed air tank, externally located, (not shown). As stated, the air is computerizedly injected. The most technologically advanced computer compressor dynamo and associate equipment should be used. The percentage of free energy will depend on material design and balance of the design.

A power take-off could be attached to the lower shaft, so as to run an electric generator, (not shown).

It is to be understood that more rows 19 of the buckets could be incorporated into the design, as wished, for producing greater power, as needed.

Referring now to FIG. 4 of the drawings, another design of ultimate energy wheel drum assembly 24 is shown wherein a plurality of wheels 25 are affixed on a shaft 26 supported rotatably free in roller bearing clamps 27 of a stationary frame 28, standing upon a base or bottom wall of a tank, or the like, containing the body of water 13 to a depth so that the wheels are fully submerged.

A plurality of rows 29 of hollow, streamlined capsules 30 are rigidly affixed to the periphery of the wheels; each capsule having a rear opening 31 and a simple flap valve 32 at its forward end; the flap valve being closable by air pressure.

A computerized air injector 23, as above-described, is extendible, as shown, in order to direct compressed air through the rear opening and into the capsule, the injector thus forming an air pump for the capsule. This air filling occurs immediately after a capsule is moved past a bottom center of the wheel periphery, so that the air provides the buoyancy necessary for causing the capsule to rise, and thus turn the wheel. When the capsule arrives above the water level 33, and passes a top center of the wheel periphery, the combined effort of air rushing outward plus the capsule dipping under water, causes the flap valve to open. Thus, water is admitted into the capsule, while the air rushes outward therefrom through the rear opening. Thus, during the capsule descent, it is filled with water. When it again gets into position for being refilled with air, the flap valve closes, so as to repeat the cycle.

As shown in the drawing, a time activator 34 is pivotable at the opening 31. As also shown, an electronic timer 35 is provided, but may be eliminated if the rotating speed is constant. The computerized injector will inject to set intervals.

Referring now to FIG. 5, another design of ultimate energy wheel drum assembly 36 is shown, wherein submerged drum 37 is supported rotatably in roller bearing guides 38. An adjustable support is provided at 39, for a dynamo 40. The assembly 36 is of advanced type, working on the same principles as assembly 24.

Supports are shown at 42, and computerized, electronically controlled pumps are shown at 43. An inlet is shown at 44 and an outlet at 45.

The wheel drum, properly designed and operated, will produce between ten to thirty percent of free energy. Wheels and drums could be joined together to any length, as wished.

In the design of assembly 36, air flow is in a direction as indicated by arrow 46. The toothed wheel 37 drives the gear 37a of the dynamo.

In FIG. 5, the air is pumped as shown. When the air reaches the culmination point (0°), it will be replaced to the low point of the drum (180°-184°). This will result in continuous clockwise movement of the drum.

FIGS. 6 and 7 show a type 47 of the invention, wherein a water tank 48 measures four by eight by twenty-four feet, for individual home use. The tank may be made either of concrete, plastic or metal. The assembly includes a storage battery 49, and a computerized air compressor and generating unit 50. A dynamo wheel support is shown at 51. FIG. 8 shows the drum 52, and the dynamo supports 53, mounted on a concrete foundation 54. It shows, also, a pump line 55.

FIG. 9 shows a modified construction, wherein two rows of buckets are mounted on a rim 56, attached to a periphery of a wheel 57, affixed on the shafts 14 of the gears 17, the buckets being on the outer side of the rim. The wheel may be made spoked.

In FIG. 10, a similar construction is shown, wherein a single row of buckets are carried on the rim. As shown in FIG. 11, the rim may be bolted to the wheel periphery, using plastic nuts and washers, as shown at 58 and 59.

While various changes may be made in the detail construction, it is understood that such changes will be within the spirit and scope of the present invention, as is defined by the appended claims.

What I now claim is:

1. An ultimate energy wheel drum assembly, comprising, in combination, a tank filled with water, at least one wheel inside said tank affixed on a horizontal shaft supported rotatably free, a plurality of receptacles carried around a periphery of said wheel, and computerized air and gas injectors at the bottom of said tank for filling said receptacles with air and gas; said receptacles comprising capsules, and said injectors protrude upwardly at an inclined angle from said tank bottom, said injectors being extendible for directing said air and gas through a rear opening in each said capsule and into said capsule.

2. The combination as set forth in claim 1, wherein each said computerized air and gas injector is connected to a hydrazin gas generator and air compressor.

3. The combination as set forth in claim 2, wherein a power take-off from said horizontal shaft is connected to an electric generator.

* * * * *